United States Patent [19]
Kitoh

[11] Patent Number: 4,570,190
[45] Date of Patent: Feb. 11, 1986

[54] TAPE REPRODUCING APPARATUS HAVING AUTOMATIC SEARCH MODE

[75] Inventor: Akihiko Kitoh, Yokohama, Japan

[73] Assignee: Victor Company of Japan, Limited, Yokohama, Japan

[21] Appl. No.: 511,610

[22] Filed: Jul. 7, 1983

[30] Foreign Application Priority Data

Jul. 9, 1982 [JP] Japan .................. 57-104044[U]

[51] Int. Cl.⁴ .................. G11B 15/44; G11B 15/10
[52] U.S. Cl. .................. 360/73 UC; 360/69; 360/93
[58] Field of Search .................. 360/69–73, 360/88, 90, 93, 137

[56] References Cited

U.S. PATENT DOCUMENTS

| | | | |
|---|---|---|---|
| 3,624,308 | 11/1971 | Kozu | 360/73 |
| 4,228,472 | 10/1980 | Magata et al. | 360/73 |
| 4,229,772 | 10/1980 | Muramatsu | 360/72.2 |
| 4,323,935 | 4/1982 | Koizumi et al. | 360/72.1 |
| 4,328,520 | 5/1982 | Iwata et al. | 360/73 |

FOREIGN PATENT DOCUMENTS

| | | |
|---|---|---|
| 2910343 | 4/1980 | Fed. Rep. of Germany . |
| 56-114141 | 9/1981 | Japan . |

OTHER PUBLICATIONS

Patent Abstracts of Japan vol. 5, No. 185, Nov. 25, 1981, p. (P-91) (857).

*Primary Examiner*—Stuart N. Hecker
*Assistant Examiner*—David J. Severin
*Attorney, Agent, or Firm*—Pollock, Vande Sande & Priddy

[57] ABSTRACT

A tape recorder comprising first and second mode selecting bars for normal- and high-speed operations respectively, a solenoid, a switch for coupling thereto a signal indicative of the presence of a recorded material, and a spring-biased lever having a first magnetic arm portion and a second arm portion pivoted at a point therebetween. The lever is rotatable between a first position toward which its first magnetic arm portion is urged for making contact with the solenoid and a second position in which its first arm portion is away from and unaffected by the energized solenoid. The second arm portion of the lever is engageable with the second bar when the lever is in the first position together with the solenoid being simultaneously energized. A latch bar engages with the first bar when operated and engages with the second bar when the latter is exclusively operated. The lever is rotated to the second position when the first bar is released allowing the second bar to engage with the latch bar and rotated to the first position when the first bar is operated allowing the second bar to engage with the second arm portion upon energization of the solenoid and disengage therefrom upon its de-energization.

3 Claims, 4 Drawing Figures

TAPE REPRODUCING APPARATUS HAVING AUTOMATIC SEARCH MODE

BACKGROUND OF THE INVENTION

The present invention relates to a tape recording/reproducing apparatus, and more particularly to a tape reproducing apparatus having an automatic program search mode which automatically searches a series of prerecorded programs and stops the apparatus at the start of a desired program. Conventional apparatus having such search modes are complex and expensive to manufacture.

SUMMARY OF THE INVENTION

The present invention provides a tape reproducing apparatus which is simple and inexpensive to manufacture.

The apparatus includes first and second manually operated, spring-biased bars urged toward a nonworking position and movable toward a working position for effecting normal and high tape speed operations respectively, and means for deriving a signal from each of a series of programs recorded in a tape when the first and second bars are simultaneously in the working position. Further included are a solenoid, and switch means for establishing a circuit between the signal deriving means and the solenoid when the second bar is in the working position to energize the solenoid in the presence of the signal. A spring-biased lever having a first magnetic arm portion and a second arm portion is pivoted at a point intermediate the arm portions, the lever being rotatable about the pivot point between a first position toward which the first magnetic arm portion is urged for making contact with the solenoid and attracted thereto when it is energized and a second position in which the first magnetic arm portion is away from and unaffected by the energized solenoid. The second arm portion of the lever is engageable with the second bar when the lever is in the first position and the solenoid is simultaneously energized. A latch means is arranged to engage with the first bar when the latter is in the working position and engage with the second bar when the latter is exclusively in the working position. The lever is rotated to the second position when the first bar is in the nonworking position whereby the second bar is allowed to engage with the latch means and allowed to return to the first position when the first bar is in the working position, whereby the second bar is allowed to engage with the second arm portion upon energization of the solenoid and disengage therefrom upon its de-energization.

BRIEF DESCRIPTION OF THE DRAWINGS

The present invention will be described in further detail with reference to the accompanying drawings, in which.

DETAILED DESCRIPTION

Figure 1:
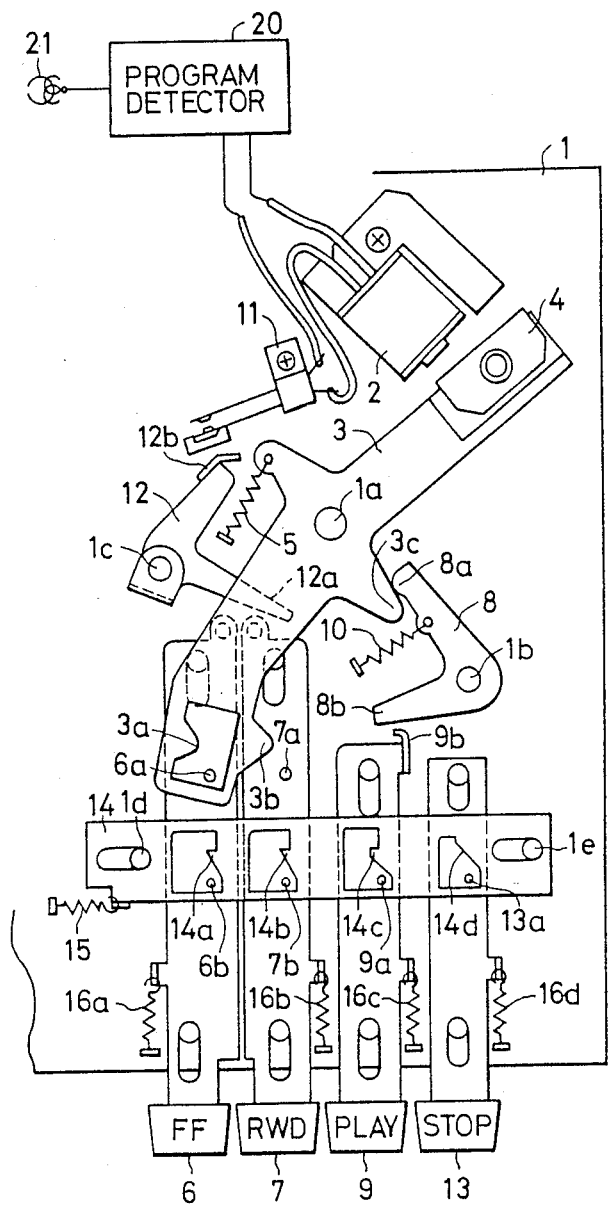
FIG. 1 is an illustration of a simplified operating mechanism of a tape recording/reproducing apparatus of the invention in which all the operating elements are in their nonworking positions.

Referring now to the drawings, various mechanical elements of the tape recording/reproducing apparatus of the invention are shown mounted on a chassis 1. For the sake of succinctness of the disclosure, mechanical elements irrelevant to the operating principle of the invention have been omitted.

Illustrated at 2 in FIG. 1 is a solenoid which is energized by a current supplied by way of a normally open switch 11 from a program detector circuit 20 during program search modes and instantly de-energized in response to the end of a recorded program. This circuit typically comprises an integrator coupled to the playback head 21, and a comparator which compares the integrator output with a threshold to generate a current for the solenoid 2 when the threshold is exceeded. During search modes, a series of recorded programs is scanned by the head 21 causing the solenoid 2 to be energized. At the end of a scanned program where no signal is recorded the solenoid is de-energized, providing an indication that the start of a subsequent program is detected. A locking lever 3 is pivoted at 1a and biased counterclockwise by a spring 5. The locking lever 3 has at one arm thereof a magnetic piece 4 adjacent to the solenoid 2, a pair of identical cam-and-notch portions 3a and 3b at the other arm, and a middle arm 3c.

Mode selecting push bars 6, 7, 9 and 13 for effecting Fast-Forward, Rewind, Playback and Stop operations, respectively, are arranged in parallel on the chassis and biased to a nonworking position by the action of springs 16a, 16b, 16c and 16d, respectively. The push bars 6 and 7 are provided with cam pins 6a and 7a for engaging the cam-and-notch portions 3a and 3b, respectively, and cam pins 6b and 7b, and the push bars 9 and 13 provided with cam pins 9a and 13a, respectively. At right angles to the push bars extends a latch bar 14 which is reciprocally mounted on the chassis by means of guide pins 1d and 1e and is normally biased to the left by the action of a spring 15. The latch bar 14 is cut out to form a plurality of cam-and-notch portions 14a, 14b and 14c, and a cam portion 14d for engaging the cam pins 6b, 7b, 9a and 13a, respectively. The cam-and-notch portions 14a and 14b are identical to each other so that forward movement of each one of the Fast-forward and Rewind push bars against the springs 16a and 16b to a working position will equally cause the latch bar 14 to slide rightwards and lock the operated push bar in the working position. The cam-and-notch portion 14c projects a greater extent with respect to the cam pin 9a than the extent by which the cam-and-notch portions 14a and 14b project with respect to the cam pins 6b and 7b, so that upon forward movement of the Playback bar 9 the pin 9a pushes the latch bar 14 rightwards a greater distance than that caused by the operation of push bars 6 and 7. The cam portion 14d is shaped so that its camming contact with the pin 13a of Stop bar 13 may cause the pins 6b, 7b and 9a to disengage from contact with their associated cam-and-notch portions to release any other operated key or keys.

Illustrated at 8 is a bell crank which is pivoted at 1b and biased counterclockwise by a spring 10 having a greater spring force than the spring 5. By the action of spring 10, a first arm 8a of the bell crank 8 exerts a thrust on the middle arm 3c of the locking lever 3 to cause it to swing clockwise to a position in which the magnetic piece 4 is away from the solenoid 2 and the cam-and-notch portions 3a and 3b are displaced laterally from the paths of movement of pins 6a and 7a. A second arm 8b of the bell crank 8 is located in a position adjacent to an abutment member 9b of the Playback push bar 9, so that upon forward movement of the push bar 9 the bell crank 8 swings clockwise, causing the spring 5 to turn the lever 3 counterclockwise to cause its cam portions 3a and 3b to come into positions engageable with the cam pins 6a and 7a of the push bars 6 and 7, respectively, while their pins 6b and 7b are not engageable with the cam-and-notch portions 14a and 14b if any of the Fast-forward and Rewind bars 6 and 7 is moved forward.

Adjacent to the switch 11 is mounted a bell crank 12 pivoted at 1c. The bell crank 12 has a first arm 12a engageable with the forward ends of the push bars 6 and 7 and a second arm 12b engageable with the normally open contacts of the switch 11.

Figure 2:
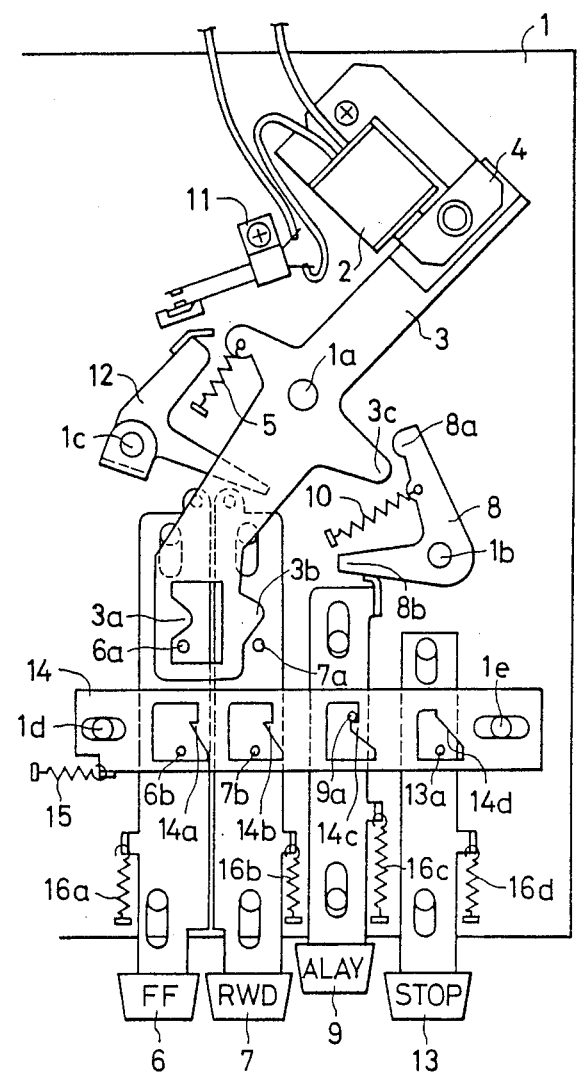
FIG. 2 is an illustration of the tape recorder mechanism switched to a playback mode.

The playback operation of the tape recording/reproducing apparatus of the invention will now be described with reference to FIG. 2. The forward movement of Playback push bar 9 causes the latch bar 14 to move to the right to such an extent that the cam-and-notch portions 14a and 14b are displaced from the path of movement of cam pins 6b and 7b and at the same time rotates the bell crank 8 clockwise against the spring 10. The locking lever 3 is free to rotate counterclockwise by the action of spring 5 until the magnetic piece 4 contacts with the solenoid 2 before it is energized upon the closure of switch 11. With the Playback bar 9 being operated, the operation of Stop push bar 13 will cause the latch bar 14 to move further to the right causing the Playback bar 9 and locking lever 3 to return to the position of FIG. 1.

Figure 3:
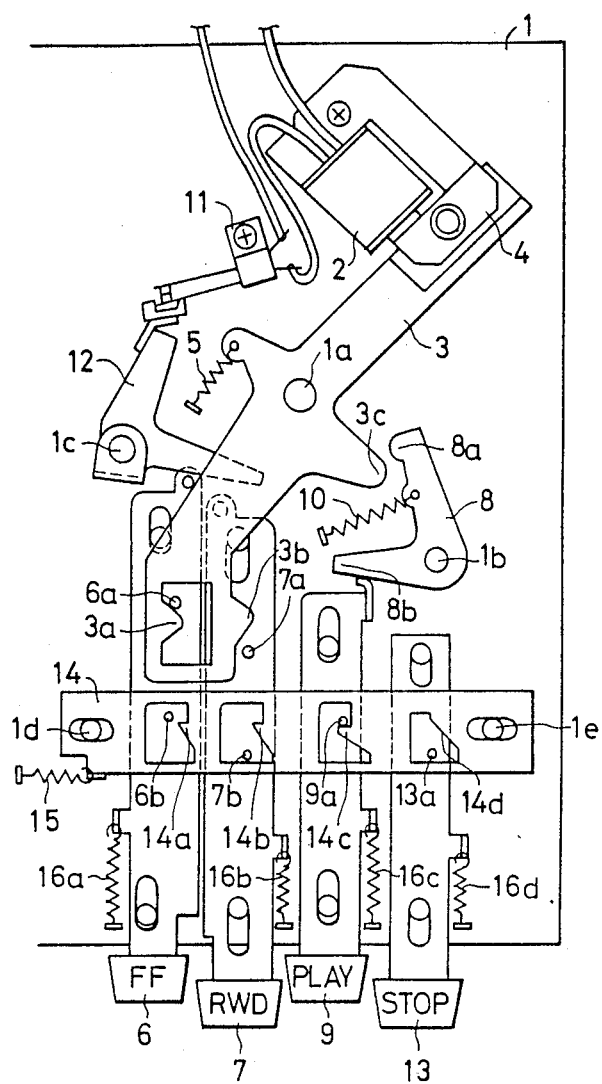
FIG. 3 is an illustration of the tape recorder mechanism operating in a program search mode.

The operation of a forward search mode will be explained with reference to FIG. 3. With the Playback bar 9 being operated (see FIG. 2), the operation of the Fast-forward bar 6 causes its cam pin 6a to ride over the cam-and-notch portion 3a. At the same time, the playback head, not shown, is retracted to a position in which it makes a slight contact with the tape and the tape is run at an increased speed in a manner well known to the art. The bell crank 12 is swung counterclockwise, closing the switch 11 to complete an output circuit of the program detector 20. A series of prerecorded materials will then be played and the circuit 20 provides a current that energizes the solenoid 2. Since the magnetic piece 4 is in contact with the solenoid 2 before the switch 11 is closed, only a small amount of current is necessary to lock the lever 3 in position. Therefore, the Fast-forward bar 6 is held in position against the spring 16a as long as the solenoid 2 is energized.

When the solenoid 2 is de-energized at the end of a program, the lever 2 is kept in contact with the solenoid only by the action of spring 5. The spring 16a has such a force that when the Fast-forward bar 6 returns to the nonworking position the pin 6a may push the cam-and-notch portion 3a leftwards against the spring 5, and the apparatus is returned to the position of FIG. 2 and starts playing the next program. If the Stop bar 13 is operated during search modes, the Playback bar 9 is returned to the nonworking position in the same manner as described above, and the playback head is disengaged from contact with the tape. The solenoid 2 is thus de-energized and the Fast-forward bar 6 is allowed to return to the nonworking position.

Automatic backward search mode is effected by operating the Rewind bar 7 with the Playback bar 9 being operated as in the forward search mode. The operation of Rewind bar 7 causes the pin 7a to engage with the cam-and-notch portion 3b against the spring 5. As in the forward search mode, the bell crank 12 is turned counterclockwise closing the switch 11 and the playback head is retracted slightly from the recording tape. The solenoid 2 is energized to lock the lever 3 in position until the end of a prerecorded material. The spring 16b is selected so that when the Rewind bar 7 returns to the nonworking position the pin 7a may push the cam-and-notch portion 3b leftwards against the spring 5, and the apparatus is returned to the position of FIG. 2.

Figure 4:
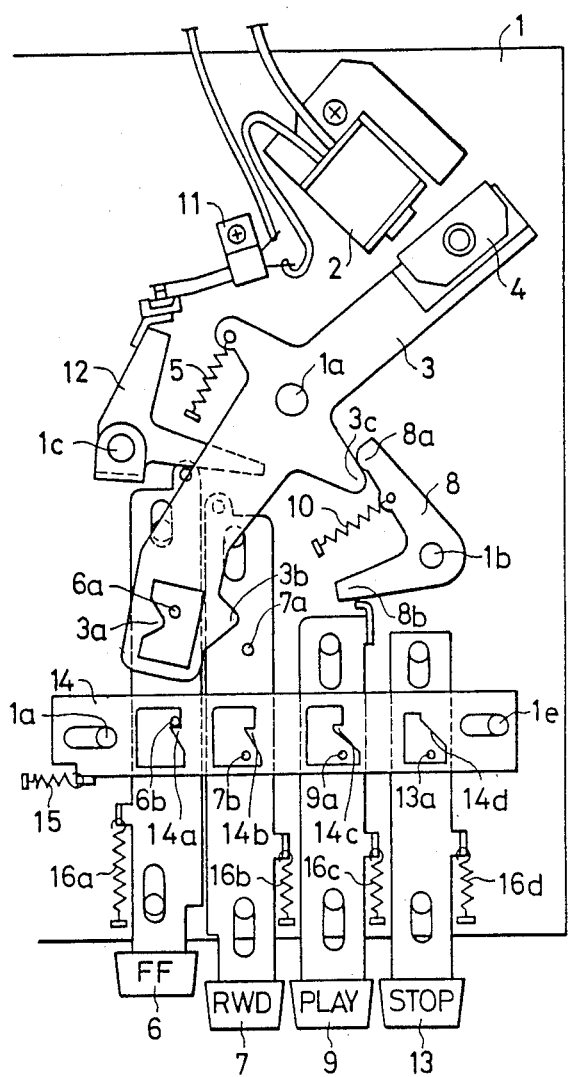
FIG. 4 is an illustration of the tape recorder mechanism operating in a fast-forward mode.

The operation of Fast-forward bar 6 with the other mode selecting bars in the nonworking position causes the tape to run at high speeds in a well known manner and enables its pin 6b to engage with the cam-and-notch 14a of the latch bar 14, while the pin 6a moves past the cam-and-notch portion 3a of lever 3 without touching it, as shown in FIG. 4. The bell crank 12 is turned counterclockwise by the bar 6, closing the switch 11 to energize the solenoid 2. However, the lever 3 remains turned clockwise by the bell crank 8, and the magnetic piece 4 is kept from the influence of the solenoid 2. The same holds true for the operation of the Rewind bar 7.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A tape producing apparatus having first and second manually operated, spring-biased bars urged toward a nonworking position and movable toward a working position for effecting normal and high tape speed operations respectively, and means for deriving a signal from each of a series of programs recorded in a tape when said first and second bars are simultaneously in the working position, comprising:

a solenoid;

switch means for establishing a circuit between said signal deriving means and said solenoid when said second bar is in the working position to energize said solenoid in the presence of said signal;

a spring-biased lever having a first magnetic arm portion, a second arm portion and an intermediate arm portion, and pivoted at a point of said intermediate arm portion, said lever being rotatable about said pivot point between a first position toward which said first magnetic arm portion is urged for making contact with said solenoid and attracted thereto when same is energized and a second position in which said first magnetic arm portion is away from and unaffected by the energized solenoid, said second arm portion being engageable with said second bar when said lever is in said first position together with said solenoid being simultaneously energized;

latch means for engaging with said first bar when same is in the working position and engaging with said second bar when same is exclusively in the working position; and means for urging said lever to said second position when said first bar is in the nonworking position to thereby allow said second bar to engage with said latch means and allowing said lever to rotate to said first position when said first bar is in the working position to thereby allow said second bar to engage with said second arm portion upon energization of said solenoid and disengage therefrom upon de-energization of said solenoid, said urging means including a spring-biased bell crank having a first arm engaging in pressure contact with said intermediate arm portion to rotate said lever to said second position and a second arm engageable with said first bar when same is in the working position to disengage said first arm from contact with said intermediate arm portion.

2. A tape producing apparatus as claimed in claim 1, wherein said second arm portion of the lever includes a cam-and-notch portion, and said second bar includes a pin for engaging with said cam-and-notch portion.

3. A tape reproducing apparatus as claimed in claim 1, wherein said latch means comprises a spring-biased member extending transversely across said first and second bars, said member having first and second cam-and-notch portions and said first and second bars are provided with a first pin engageable with said first cam-and-notch portion and a second pin engageable with said second cam-and-notch portion, respectively, said cam-and-notch portions having lateral projections, the projection of said first cam-and-notch portion being greater than the projection of said second cam-and-notch portion.

* * * * *